(12) United States Patent
Hanes

(10) Patent No.: US 7,945,643 B2
(45) Date of Patent: May 17, 2011

(54) RULES FOR SHARED ENTITIES OF A NETWORK-ATTACHED STORAGE DEVICE

(75) Inventor: David H. Hanes, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1051 days.

(21) Appl. No.: 11/742,341

(22) Filed: Apr. 30, 2007

(65) Prior Publication Data

US 2008/0270574 A1    Oct. 30, 2008

(51) Int. Cl.
*G06F 15/16* (2006.01)
(52) U.S. Cl. .......................... 709/219; 709/217; 709/218
(58) Field of Classification Search ........... 709/217–219
See application file for complete search history.

(56) References Cited

U.S. PATENT DOCUMENTS

| 7,035,882 B2 | 4/2006 | Takeda et al. |
| 7,103,650 B1 * | 9/2006 | Vetrivelkumaran et al. .. 709/221 |
| 2003/0163652 A1 | 8/2003 | Tsuge |
| 2004/0153416 A1 | 8/2004 | Fujimotot |
| 2004/0199639 A1 * | 10/2004 | Harris ........................... 709/227 |

FOREIGN PATENT DOCUMENTS

JP    2004030437    1/2004

* cited by examiner

*Primary Examiner* — Joseph Avellino
*Assistant Examiner* — Mohamed Wasel

(57) ABSTRACT

A system comprises storage configurable, at least in part, into a plurality of shared entities. The storage comprises rules. Each rule is configurable to specify one or more of the shared entities to associate with a specified computer identity so that at least one computer identity is associatable with a different set of shared entities from at least one other computer identity.

13 Claims, 2 Drawing Sheets

RULES FOR SHARED ENTITIES OF A NETWORK-ATTACHED STORAGE DEVICE

BACKGROUND

In many environments (e.g., offices, homes, etc.), multiple computing entities are networked together. An example of a device that has become desirable to include in a network is a network-attached storage (NAS) device. A NAS device comprises storage (e.g., one or more hard disk drives) that, being coupled to a network, can be accessed by one or more computers on the network. Via the network, a computer can access data (writes and reads) on the NAS. A NAS thus provides a shared storage resource available to multiple computers.

Some storage devices such as universal serial bus (USB) flash drives (which are not NAS devices) can be connected directly to a computer (e.g., via a USB port). Upon connecting a USB drive to a computer, the drive automatically becomes available for access on the computer (e.g., an "E" drive). A user thus can immediately use the drive. A NAS device, however, is not automatically made available on the computer(s) coupled to the NAS device via the network. This lack of automatic and immediate NAS device access is problematic for many users who may not know how to configure the computer to recognize and access the NAS device, or may prefer not to bother with such a configuration process.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figures 1, 2:
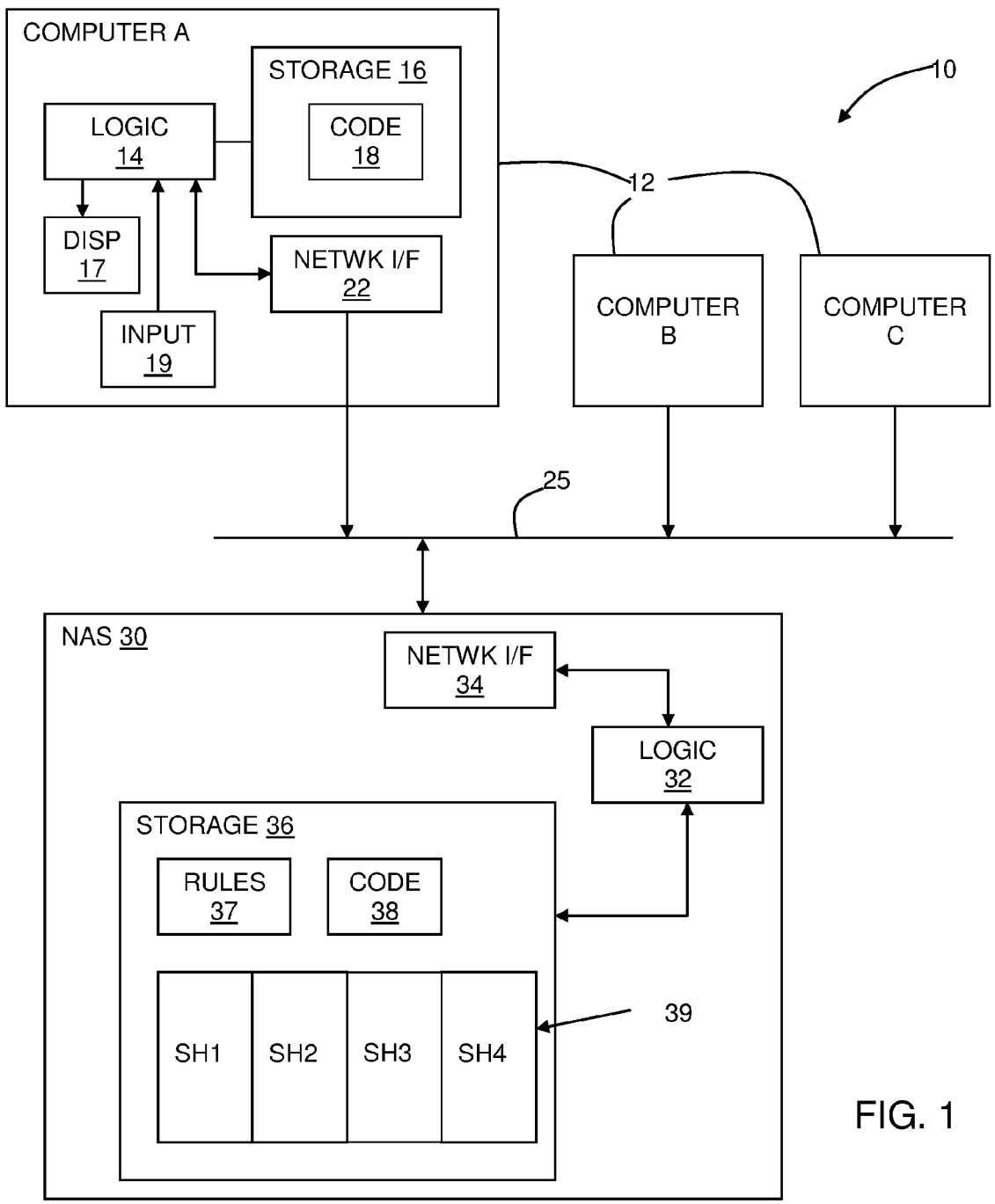
FIG. 1 shows a system in accordance with various embodiments.
FIG. 2 illustrates rules stored in the system of FIG. 1.

FIG. 1 shows a system 10 in accordance with various embodiments. As shown, system 10 comprises one or more computers 12 communicatively coupled together and to a network-attached storage device (NAS) 30 via a network link 25. FIG. 1 shows three computers 12 (designated as computer A, computer B, and computer C), but the number of computers can be other than three (i.e., one or more). Each computer 12 may comprise a desktop computer, a notebook computer, a server, or any other type of computing entity. Via the network 25, each computer 12 can access the NAS device 30. An access can be to write data to the NAS device 30 or to read data from the NAS device.

Each computer 12 comprises logic 14 coupled to storage 16 and to a network interface 22. The logic 14 comprises a processor adapted to execute code 18 stored on the storage 16. The code 18 may comprise an operating system, one or more applications, one or more drivers, or other executable software items. The storage 16 comprises a computer-readable medium such as volatile memory (random access memory), non-volatile storage (e.g., hard disk drive, read-only memory, Flash memory, etc.), or combinations thereof. Via the network interface 22, which may comprise a network interface controller (NIC), the computer's logic 14 can access other computers 12 and/or the NAS device 30. Each computer 12 may also comprise a display 17 and an input device 19 (e.g., keyboard, mouse, etc.) coupled to the logic 14. Via the display 17 and input device 19, a user can operate the computer 12.

Referring still to FIG. 1, the NAS device 30 comprises logic 32 coupled to network interface 34 and to storage 36. The logic 32 comprises a processor adapted to execute code 38 stored on the storage 36. The code 38 may comprise an operating system, firmware, one or more applications, one or more drivers, or other executable software items. The storage 36 comprises a computer-readable medium such as non-volatile storage (e.g., hard disk drive, read-only memory, Flash memory, etc.) in some embodiments. In other embodiments, the storage 36 comprises a computer-readable medium such as volatile memory (random access memory), non-volatile storage, or combinations thereof. Via the network interface 34, which may comprise a network interface controller (NIC), the NAS' logic 32 can be accessed by the computers 12.

The storage 36 of the NAS 30 is configured to comprise one or more shared entities 39. A shared entity (sometimes referred to as a "share") comprises a shared folder. In the example of FIG. 1, four shared entities 39 are shown as SH1, SH2, SH3, and SH4. Each shared entity 39 can comprise data written to it by any computer 12 permitted access to that particular shared entity. In accordance with embodiments of the invention, each shared entity 39 can be shared by one or more of the computers 12. Further, each shared entity 39 can be configured to be associated with a different set of computers than other shared entities. For example, SH1 may be configured to be shared by computer A and computer B, but not computer C, while SH2 may be configured to be shared by computer A and computer C, but not computer B. As such, at least one computer 12 can be associated with a different set of shared entities than at least one other computer 12.

The configurability of the NAS device 30 to associate individual computers 12 with individual shared entities 39 is made by possible using rules 37. Rules 37 comprise a separate rule for each computer 12. Each computer 12 comprises a computer identity. The identity of a computer may comprise its name, address, serial number, etc. A computer identity uniquely distinguishes one computer 12 from another. A computer 12 can communicate its identity over the network 25 at least from the computer 12 to the NAS device 30.

FIG. 2 illustrates an example of rules 37. For each computer identity (assumed to be "A," B," and "C" in FIG. 2), one or more identities of shares (SH1, SH2, etc.) are provided. As explained above, different computers 12 may be associated with a different set of shares. In the example of FIG. 2, computer A is associated with shares SH1, SH2 and SH4. That is, computer A is to be permitted access to shares SH1, SH2 and SH4, but no other shares (i.e., share SH3). Computer B is associated with SH1, SH3, and SH4, while computer C is associated with only SH4. Share SH4 is common to all computers. In some embodiments, a separate rule can be provided that specifies which shares are to be associated with all computers.

The rules 37 are stored in NAS device 30 and are specified by a user of a computer 12. In some embodiments, a default set of rules are specified by the manufacturer of the NAS device 30 and can later be changed by a user of the NAS device. Logging into a computer with a password so as to enable, for example, various administrator access privileges, enables a user to specify the shared entity identifier(s) for each computer identity. In some embodiments, the functionality in the computer 12 that enables a user to configure the rules 37 is by way of code 18 executed by a process or in logic 14. Such code may provide a web interface or other suitable graphical user interface. Code 18 that enables a user to configure the rules may be present on all computers, or only some, and in some embodiments, only users that log in under a domain as an administrator can configure the rules 37. In other embodiments, administrator rights are not required to configure the rules 37, that is, any user of a computer 12 can configure the rules 37 as described herein.

After the rules 37 have been configured in the NAS device 30, each computer 12 interacts with the NAS device and is configured to access the shared entities 39 in accordance with that computer's rule. When a computer 12 is powered on, code 18 causes the computer's processor to perform a discovery process by which the computer 12 determines whether, perhaps among other things, one or more NAS devices 30 are present on the network. If such a NAS device 30 is present, the NAS device receives that computer's identity (e.g., its name), examines the rule associated with that particular computer identity, and sends a message to the computer to inform the computer as to the identity of the shared entities that computer's rule specifies. The computer receives the shared entity identities and configures itself to access the specified shared entities. In some embodiments, the computer maps a drive designator to each specified shared entity.

The user of the computer 12 thus is able to access the particular shared entities on the NAS device 30 that the rule for that particular computer permits. In various embodiments, the computer cannot access other shared entities not included in its associated rule.

Figure 3:
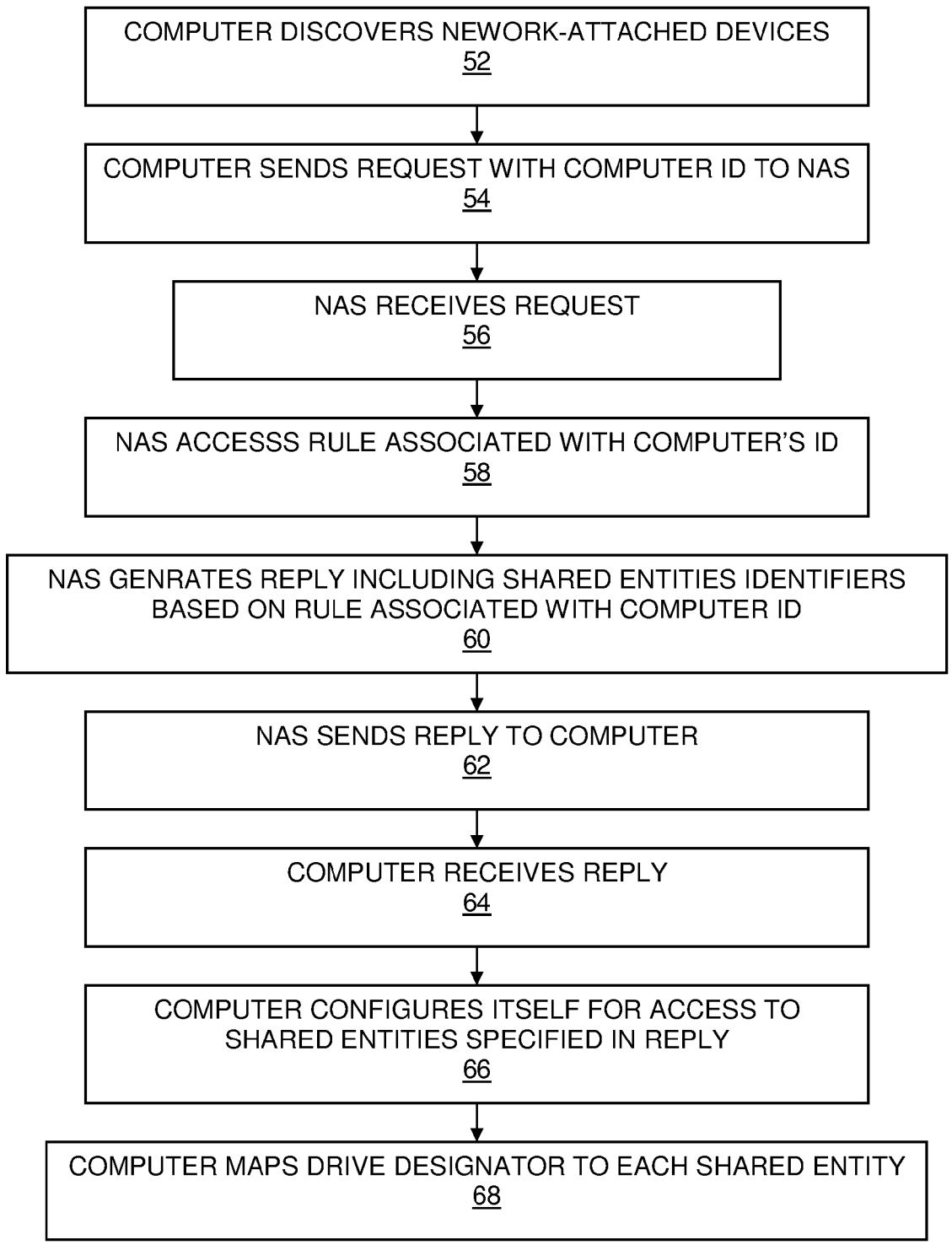
FIG. 3 illustrates a method in accordance with various embodiments.

FIG. 3 shows an illustrative method in accordance with various embodiments by which a computer discovers the NAS device 30 and configures itself based on the rules 37 stored in the NAS device. Some of the actions shown in FIG. 3 are performed by a computer 12, while other actions are performed by NAS 30. In various embodiments, code (18 in computer 12 and 38 in NAS device 30) is executed by the respective logic 14 and 32 to perform the various actions shown in FIG. 3. The code that performs these actions in the computer may comprise the computer's operating system. The actions shown can be performed in the order shown, or in a different order.

At 52, the method comprises the computer 12 performing a discovery process to discover any network-attached storage devices 30. This action may be performed by the computer sending a message over network 25 requesting any device connected to the network to reply with its identity. Once the computer 12 discovers that a particular NAS device 30 is present, then at 54, the computer 12 sends a request to the NAS device 30 for the NAS device to report what shared entities it possesses for the computer 12 to access. The request comprises at least the computer's identity. At 56, the NAS device 30 receives the request.

At 58, the NAS device 30 accesses its rules 37 for the rule associated with the requesting computer (using the requesting computer's computer identity). At 60, the NAS device 30 generates a reply for the computer. The reply comprises the identities of the shared entities from the rule 37 associated with the requesting computer. At 62, the NAS device 30 sends the reply across the network 25 to the computer. The computer receives the reply at 64 and, at 66, configures itself (the computer) for access to the shared entities specified in the reply. At 68, the computer maps drive designators to the shared entities. The drive designators mapped by the computer 12 may comprise the next available drive designator. That is, the computer 12 selects its own drive designators for use in the mapping process of action 68.

In some embodiments, the NAS device 30 stores a drive designator for each of its shared entities 39. For example, NAS device 30 may store drive designators E, F, G, and H for SH1, SH2, SH3, and SH4, respectively. In such embodiments, the NAS device 30 forms the reply message (60) to also comprise the drive designator for each of the shared entity identifiers specified in the reply. In such embodiments, the NAS device 30 informs the computer which drive designators to use with each shared entity specified in the reply thereby precluding the drive from selecting its drive designators. This embodiment helps to ensure that the same shared entities are mapped to the same drive designators each time a computer 12 interacts with the NAS device 30 as in FIG. 3.

In some embodiments, the method of FIG. 3 is performed each time a computer 12 boots. In other embodiments, the method of FIG. 3 is performed at predetermined time intervals (e.g., once per minute). In still other embodiments, the method of FIG. 3 is performed each time a computer 12 boots and at predetermined time intervals. A computer 12 will thus dynamically reconfigure itself if a NAS device 30 replies with a different shared entity identifier than for which the computer was currently configured. If during the discovery process of action 52, no NAS device is discovered then the rest of the method (54-68) is not performed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   storage configurable, at least in part, into a plurality of shared entities based upon one or more rules native to and resident upon the storage, said storage comprising rules, each rule being configurable to specify at least one of the shared entities to associate with a specified network computer so that at least one network computer is associatable with a unique set of shared entities;
   a network interface coupled to logic, wherein, via said network interface, a user of the storage specifies at least a portion of the one or more rules for at least one network computer, wherein at least a portion of said rules comprise a drive designator associated with each of the shared entities; and
   a network computer for receiving an identity of at least one of the plurality of shared entity and an associated drive designator from said logic across said network and said network computer and mapping the identity of the shared entity to the drive designator; and
   said network computer dynamically reconfigures itself if at least one of the shared entities replies with a different shared entity identifier than for which said network computer was currently configured to access.

2. The system of claim 1 further comprising a network interface coupled to logic, wherein, via said network interface, a user of storage specifies at least a portion of the one or more rules for a plurality of network computers.

3. The system of claim 1 wherein said storage comprises a network-attached storage device.

4. The system of claim 1 wherein said logic receives a request from a network computer via a network and, in response to said request, said logic provides the specified network computer with one or more shared entities associated with the requesting network computer.

5. The system of claim 4 wherein said received request comprises an identifier associated with the network computer.

6. The system of claim 1 wherein each shared entity comprises a shared folder.

7. The system of claim 1 further comprising a plurality of network computers communicatively coupled to said logic via a network and each of said plurality of network computers map an identity of a shared entity received from said logic to a drive designator.

8. A method, comprising:
    receiving a request from a network computer across a network;
    generating a reply to said request using, from among a plurality of rules each specified for a different network computer, a rule specified for said network computer, said rule comprising a shared entity identifier, wherein generating the reply comprises drive designator;
    transmitting said reply across said network to said network computer;
    generating said plurality of rules, at least one rule comprising a shared entity identifier that is not included in at least one other rule;
    mapping the drive designator provided in the reply to the shared entity identifier according to at least one of the plurality of rules provided in the reply; and
    said network computer dynamically reconfigures itself if a shared entity replies with a different shared entity identifier than for which said network computer was currently configured to access.

9. The method of claim 8 further comprising mapping a drive identifier to the shared entity identifier provided in the reply.

10. The method of claim 8 further comprising performing a discovery process across said network for network-attached devices comprising said rules.

11. A non-transitory computer-readable storage medium comprising software that, when executed by a processor, causes the processor to:
    provide a user interface to enable a user to configure one or more rules on network-attached storage device;
    initiate a discovery process on a network for said network-attached device; upon detecting said network-attached device, send a request to said detected network-attached device;
    receive a reply from said detected network-attached device, said reply comprising an identifier of a shared entity of said detected network-attached device and a drive designator;
    map said drive designator to said detected network-attached device; and
    said network computer dynamically reconfigures itself if said shared entity replies with a different shared entity identifier than for which said network computer was currently configured to access.

12. The computer-readable medium of claim 11 wherein said software causes the processor to generate said request comprising an identifier of said computer.

13. The computer-readable medium of claim 11 wherein each rule comprises, for a specified computer identifier, at least one shared entity identifiers.

* * * * *